Dec. 2, 1969    C. GLANDIN ET AL    3,481,021
METHOD OF MANUFACTURING FUEL ASSEMBLIES
Filed May 24, 1966
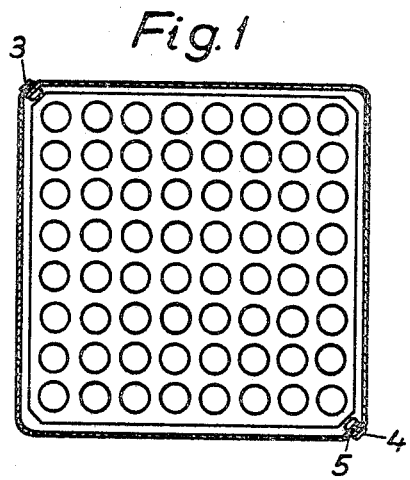
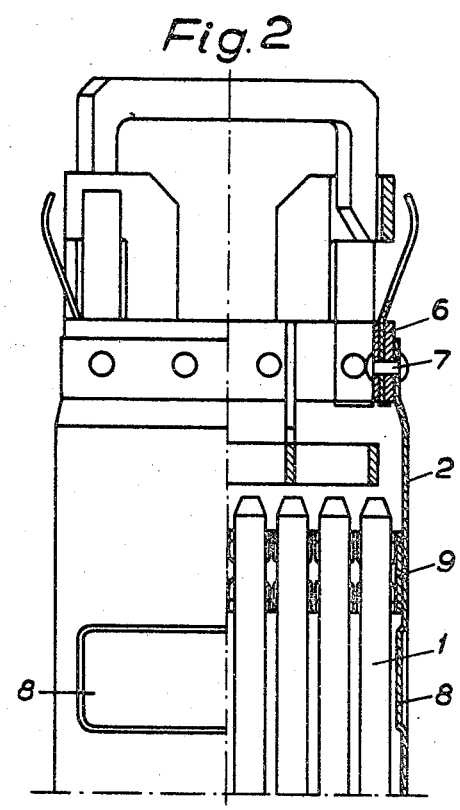
INVENTOR.
CONSTAN GLANDIN
HARALD SKAR
BY
Bailey, Stephens+Huettig
ATTORNEYS

United States Patent Office 3,481,021
Patented Dec. 2, 1969

3,481,021
METHOD OF MANUFACTURING FUEL ASSEMBLIES
Constan Glandin, Vasteras, and Harald Skar, Lidingo, Sweden, assignors to Allmanna Svenska Elektriska Aktiebolaget Vasteras, Sweden, a Swedish corporation
Filed May 24, 1966, Ser. No. 552,568
Claims priority, application Sweden, May 24, 1965, 6,734/65
Int. Cl. B23p 19/04; G21c 3/30
U.S. Cl. 29—455                                  10 Claims

ABSTRACT OF THE DISCLOSURE

A method of assembling nuclear fuel assemblies having square cross section, in which two identical casing halves are fitted in their proper positions around a fuel rod bundle, holes for rivets or screws are effected by simultaneous boring through casing parts overlapping each other at two corner points of the cross section and rivets or screws of a type which can be secured in place from the outer side only of the casing are inserted in said holes and secured. Each casing half may have rectangular depressions forming stiffening deformations which can also be made to counteract axial displacement of the spacers. The casing is a supporting part of the fuel assembly.

---

The present invention relates to a method of manufacturing fuel assemblies with substantially polygonal cross section, comprising a number of fuel rods and a casing surrounding the fuel rods.

The fuel assemblies in a nuclear reactor are usually surrounded by a casing which in the form of a tube-like jacket surrounds the fuel assembly. This casing must be manufactured with very great accuracy and fulfill high tolerance demands in order that acceptable fuel assemblies can be produced. Since the fuel rods in a fuel assembly do not endure particularly high temperatures, the casing of the fuel assembly cannot be welded when the fuel assembly is built up. The casing has therefore previously been manufactured as a ready-welded tube with polygonal, usually square, cross section which as a finished unit has been drawn on to the fuel assembly. Since the fuel assemblies are usually very long, it is obvious that the difficulties of manufacturing and mounting such a casing tube with regard to the strong tolerance demands are exceptionally great, which in its turn entails greatly increased costs.

The object of the present invention is to considerably reduce the manufacturing costs for the casing of the fuel assembly. The invention is characterised in that the casing is formed of bent sheet metal parts which during the erection of the fuel assembly are joined together by means of riveting or screwing which can be performed from one side only of the sheet. Single-sided riveting can be carried out with so-called pop rivets or with blast rivets. Screwing can be carried out with plate screws which however must be locked in some convenient manner. The method according to the invention makes it possible to form the casing of the fuel assembly of simple bent sheet metal parts which are not joined together before the erection of the fuel assembly. By this means the manufacture of fuel assemblies is considerably simplified both regarding the manufacture of the casing and its fitting in its place on the fuel assembly.

In order to effect great accuracy during the joining together of the casing parts, according to the invention the holes for the rivets or screws can be effected by simultaneous boring through portions of the casing parts overlapping each other, which parts are fitted in their respective positions on the fuel assembly. Further, the construction of the assemblies can be simplified by joining the casing parts together at two or several of the corner points of the polygonal assembly cross section. In fuel assemblies with square cross section it is of course most advantageous to form the casing of two exactly alike bent sheet metal parts.

In the following the invention will be explained in more detail with reference to the accompanying figures, of which FIG. 1 shows a cross section of a fuel assembly manufactured according to the method according to the invention and FIG. 2 shows partly in axial section a part of the same assembly.

In the figures, 1 designates the fuel rods of the assembly and 2 the surrounding casing. The fuel assembly shown has a substantially square cross section and the casing 2 is therefore formed of two identical bent sheet metal parts which are joined together by means of single-sided riveting at two corners 3 and 4 diagonally opposite each other. At these corners the casing parts are bent at an angle of 45° to the side plane so that attachment flanges 5 are provided.

From FIG. 2 it is evident that the casing 2 forms a supporting part of the fuel assembly and holds together the end portions of the fuel assembly of which only the upper one 6 is shown on the figure. The attachment to the end parts has been carried out with rivets 7 in the embodiment shown, but locked screws are of course also feasible. The plane side surfaces of the casing 2 are provided with stiffening inwardly extending deformations 8 in the form of essentially rectangular stampings in the casing plate. The recess 8 can of course have any other suitable form and serves partly to stiffen the sheet metal, partly to effect turbulence in the water flow along the fuel assemblies when these are inserted in a reactor during operation and partly to prevent the spacers 9 which are arranged to fix the mutual distance between the fuel rods 1 from sliding in an axial direction.

In a nuclear reactor the fuel assemblies are placed so that the rivet or screw joints of the assemblies are turned away from the control rods of the reactor. This means that the control rods are placed adjacent those corners of the fuel assemblies which have no joints. By this means no risk of damaging the control rods by striking against the rivets or screws of the fuel assemblies is present.

The invention is not limited to the shown embodiment, but a plurality of variations and modifications are feasible within the scope of the following claims.

We claim:
1. Method of manufacturing fuel assemblies with substantially polygonal cross section, a number of fuel rods and a casing surrounding the fuel rods, comprising the steps of forming the casing of bent sheet metal parts, fitting said parts in their proper positions on the fuel assembly and thereafter joining said parts to each other using joint elements of a type which can be secured in place from the outer side only of said sheet metal parts.

2. Method according to claim 1, comprising the step of providing holes for the joint elements by boring simultaneously through such portions of the casing parts which are overlapping each other while fitting said parts in respective positions on the fuel assembly.

3. Method according to claim 1 comprising the step of joining said casing parts by means of single-sidedly applicable rivets.

4. Method according to claim 1, comprising the step of forming said casing parts with joint portions corresponding to at least two of the corner points of the polygonal cross section.

5. Method according to claim 4, comprising the steps of bending said casing parts at the corner points of the polygonal cross section at approximately the same angle in relation to the adjacent side lines of the polygonal cross section and forming said bent parts as attachment flanges adapted to fit into one another.

6. Method according to claim 1, for manufacturing fuel assemblies with rectangular cross section, comprising the steps of forming said casing parts as two essentially identical sheet metal parts and joining them at two diagonally opposite corner points of the polygonal cross section of the fuel assembly.

7. Method of manufacturing fuel assemblies with substantially polygonal cross section, a number of fuel rods and a casing surrounding the fuel rods, comprising the steps of forming the casing of bent sheet meal parts, fitting said parts in their proper positions on the fuel assembly, thereafter joining said parts to each other using joint elements of a type which can be secured in place from the other side only of said sheet metal parts, forming said casing as a supporting part of the fuel assembly and providing it with attachment means cooperating with attachment means on end members of the fuel assembly engaging the fuel rods.

8. Method according to claim 7, comprising the step of forming said casing with substantially plane side planes and providing said side planes with stiffening deformations.

9. Method according to claim 8, comprising the step of forming stiffening deformations as essentially rectangular depressions in the casing plate.

10. Method according to claim 9, comprising the step of forming at least a part of said stiffening deformations to cooperate with spacers arranged in the fuel assembly to fix the mutual distance between the fuel rods, said cooperation counteracting axial displacement of said spacers.

References Cited

UNITED STATES PATENTS

| | | | |
|---|---|---|---|
| 556,056 | 3/1896 | Heath | 220—4 |
| 1,299,232 | 4/1919 | Rosenberg | 29—526 |
| 1,389,154 | 8/1921 | Newhouse | 29—526 X |
| 1,608,046 | 11/1926 | Stanley | 220—4 |
| 1,796,024 | 3/1931 | Hohler | 312—257 X |
| 2,514,364 | 7/1950 | Bates | 220—4 X |
| 2,665,779 | 1/1954 | Smith et al. | 29—463 X |
| 3,193,921 | 7/1965 | Kahn | 29—526 X |
| 3,228,854 | 1/1966 | Bekkering et al. | 176—78 |
| 3,238,108 | 3/1966 | Deddens et al. | 176—78 X |
| 3,356,587 | 12/1967 | Heck | 176—78 |

CHARLIE T. MOON, Primary Examiner

U.S. Cl. X.R.

29—463, 526; 74—606; 176—78; 220—4; 312—263